W. I. WHEELER.
HYDRAULIC TRANSMISSION DEVICE.
APPLICATION FILED DEC. 4, 1912.
1,099,412.
Patented June 9, 1914.
4 SHEETS—SHEET 2.
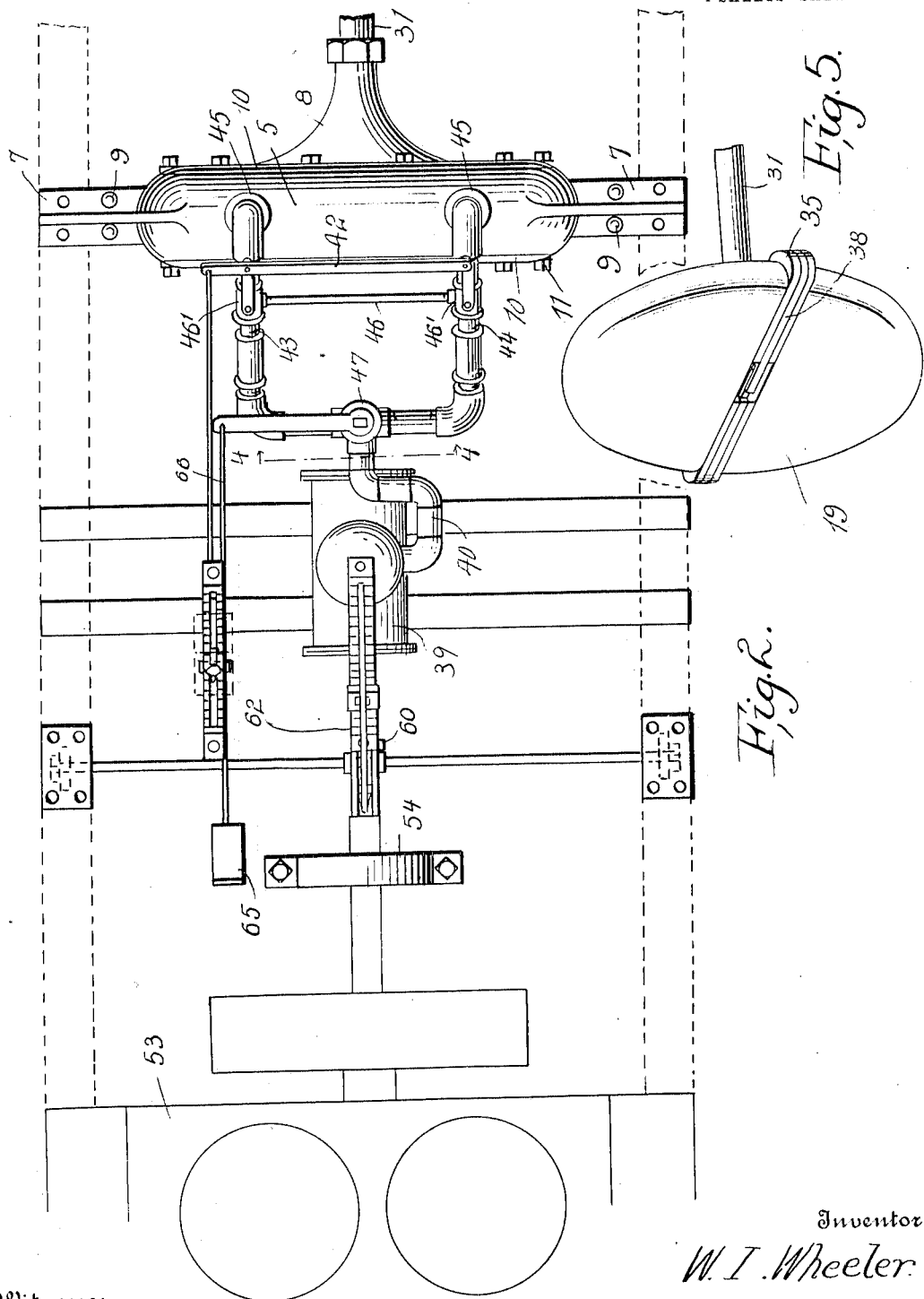
Witnesses
Robert M. Cutphend.
A. I. Hind.
Inventor
W. I. Wheeler.
By Watson E. Coleman
Attorney

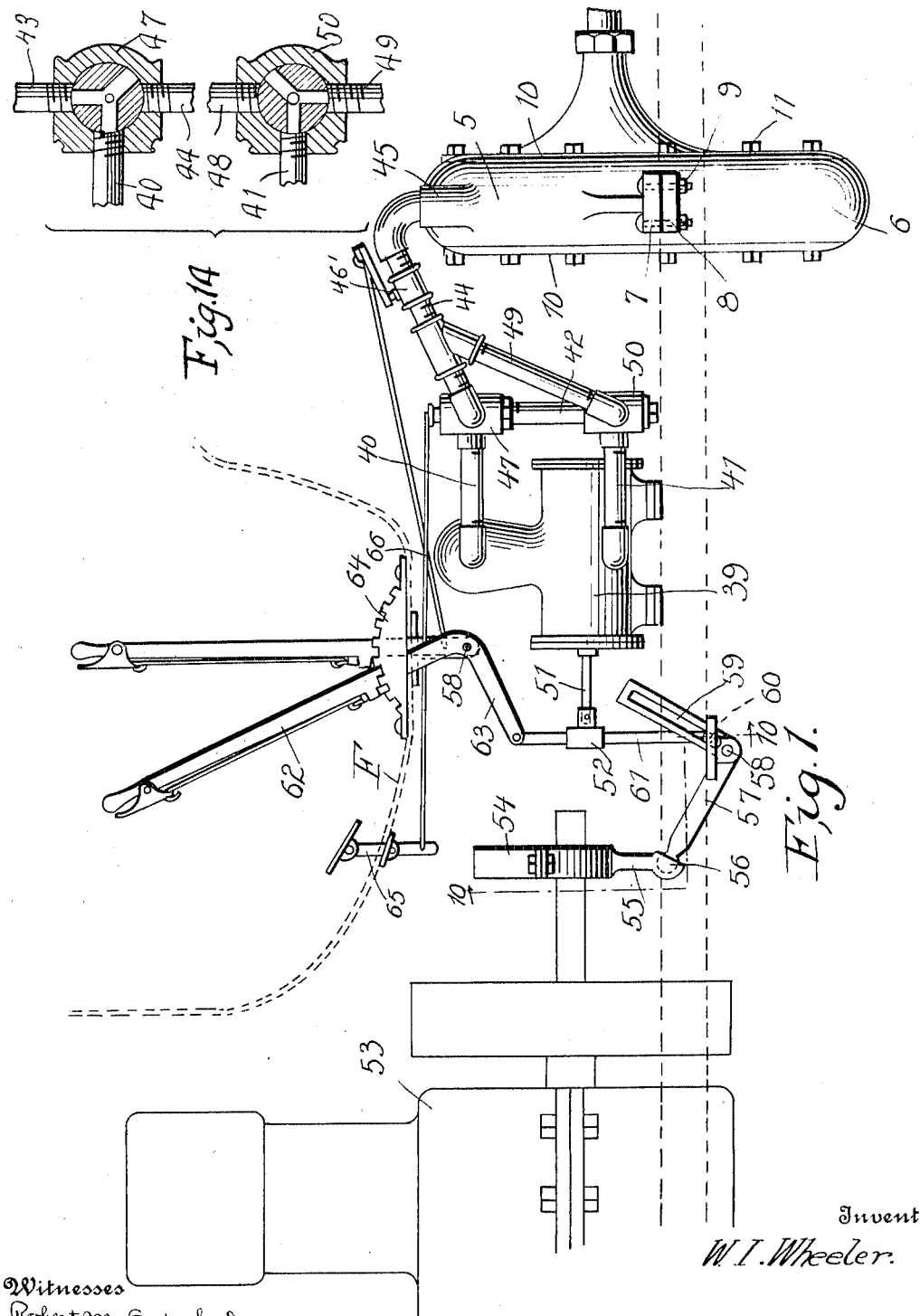

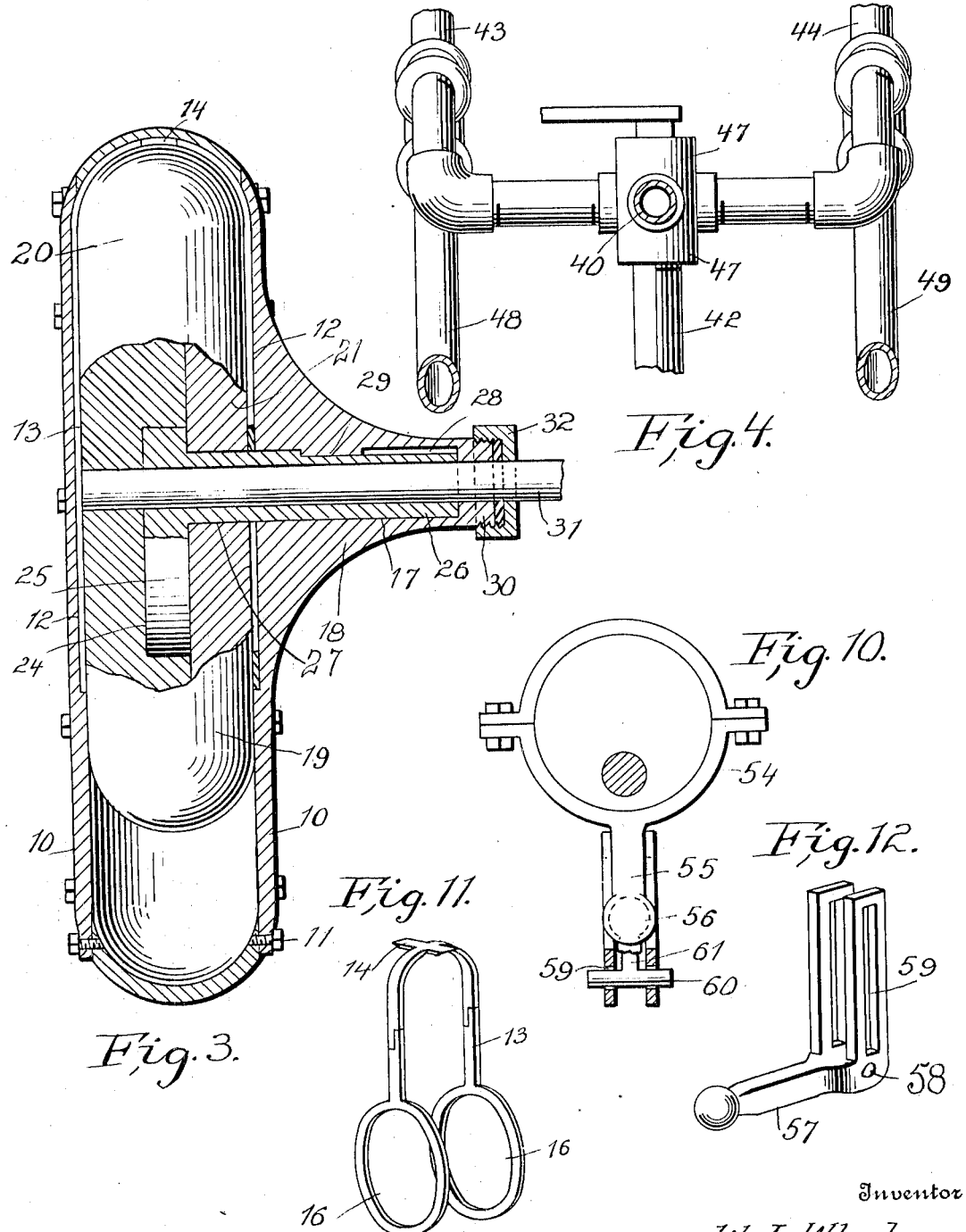

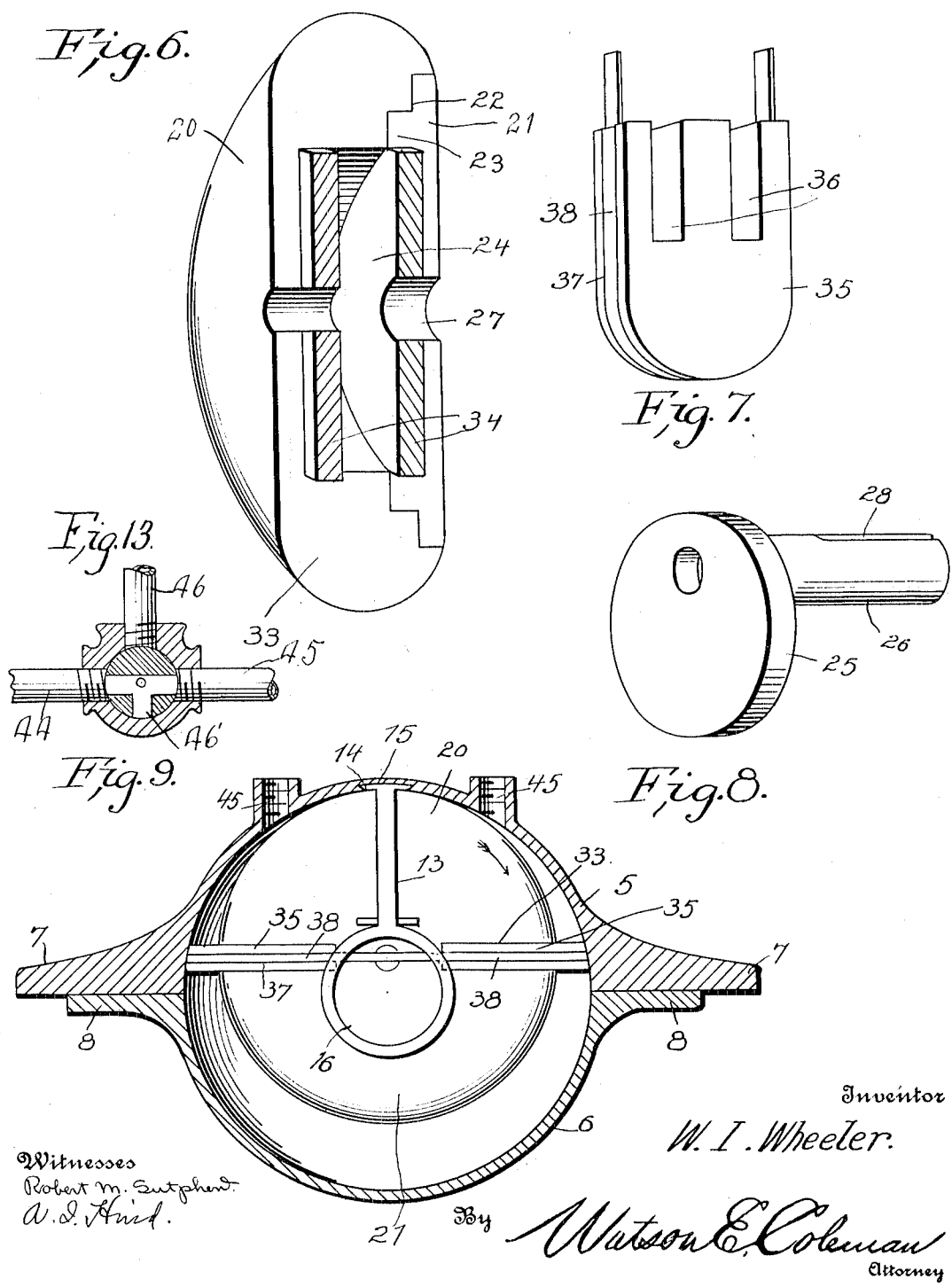

UNITED STATES PATENT OFFICE.

WILLIAM I. WHEELER, OF SCOTTVILLE, ILLINOIS.

HYDRAULIC TRANSMISSION DEVICE.

1,099,412. Specification of Letters Patent. Patented June 9, 1914.

Application filed December 4, 1912. Serial No. 734,972.

*To all whom it may concern:*

Be it known that I, WILLIAM I. WHEELER, a citizen of the United States, residing at Scottville, in the county of Macoupin and State of Illinois, have invented certain new and useful Improvements in Hydraulic Transmission Devices, of which the following is a specification, reference being had to the accompanying drawings.

This invention relates to improvements in hydraulic transmission devices for motor vehicles and has for its primary object to provide a power transmission device whereby a number of speeds may be effected without necessitating the shifting of gears.

Another object of the invention is to provide an improved power transmission device whereby the use of the ordinary transmission gearing such as is generally employed upon motor vehicles may be entirely dispensed with, thus eliminating the sudden jar or shock to the body of the machine when the power is transmitted to the vehicle axles.

Still another object of the invention is to generally improve and simplify transmission mechanism of this type and to provide means controlled by the driver for easily, quickly and positively reducing or increasing the driving speed.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a power transmitting device embodying the present invention, illustrating the speed changing means and a portion of the vehicle motor; Fig 2 is a top plan view; Fig. 3 is an enlarged section through the motor casing, the rotor being shown partly in section; Fig. 4 is a section taken on the line 4—4 of Fig. 2; Fig. 5 is a perspective view of the rotor complete; Fig. 6 is a sectional perspective view of the rotor; Fig. 7 is a similar view of one of the pressure receiving blades; Fig. 8 is a detail perspective view of the stationary eccentric; Fig. 9 is a section through the motor casing, the rotor being shown in elevation; Fig. 10 is a detail section taken on line 10—10 of Fig. 1; Fig. 11 is a detail perspective view of the packing strip arranged upon the inner wall of the transmission casing, Fig. 12 is a detail perspective view of bell crank lever through the medium of which the length of stroke of the pump piston is varied. Figs. 13 and 14 are detail sections illustrating the construction and mounting of the valves 47 and 50, and valve 46'.

Referring in detail to the drawings, 5 and 6 designate the upper and lower sections respectively of the annular peripheral wall of the motor case. These annular wall sections are of substantially semicircular form in cross section and are provided at their ends with the arms 7 and 8, the arms 7 of the upper section projecting beyond the ends of the arms 8 of the lower section, said arms 7 being adapted to be rigidly secured upon a frame or other supporting structure. The arms 7 and 8 are rigidly bolted together as indicated at 9. The side plates 10 of the motor case are secured at their edges to the annular wall sections 5 and 6 by means of the bolts or rivets 11. The inner opposed faces of these side plates are channeled or grooved as indicated at 12 to receive the parallel portions of a packing strip 13. The intermediate portion of this strip is curved into concentric relation with the peripheral wall of the casing and is centrally provided with an extension 14 to be received in a groove 15 formed in the inner face of the annular wall section 5. The ends of this extension 14 of the packing strip are beveled for engagement with the undercut end walls of the groove 15. Each end of the packing strip 13 is provided with an annulus 16 for a purpose which will be later referred to. The casing plate 10 has integrally formed upon its outer face, a tubular bearing arm 18, the bore 17 of which is eccentrically located with respect to the motor.

Within the motor case, a rotor generally indicated by the numeral 19 is arranged. This rotor consists of two sections 20 and 21, the section 20 constituting the major portion of the rotor and being provided in one face with a circular recess, the annular wall of which is stepped or shouldered as indicated at 22. The other rotor section 21 is provided upon its outer edge with an annular flange 23 to seat against the shoulder 22. The rotor section 20 is also provided in its recessed face with an eccentrically disposed pocket 24. This pocket receives the stationary eccentric 25, said eccentric being provided with a sleeve 26 which is loosely disposed through a concentrically located opening 27 in the rotor section 21, said opening communicating at its inner end with the pocket 24. The sleeve 26 of the eccentric is provided with a key way 28 to receive a key 29 formed upon the wall of the enlarged inner end 30 of the bore of the bearing arm 18. The power transmission shaft 31 extends through the eccentric sleeve 26 and is fixed in the rotor section 20. A packing nut 32 is arranged upon the outer end of the bearing arm 18 and prevents the escape of the actuating fluid from the motor casing.

The rotor 19 is provided with a radial slot or guideway 33 and the parallel ribs 34 connect the opposed walls of this guide way, one of said ribs being carried by each of the rotor sections. The pressure receiving blades indicated at 35 are arranged for radial movement in the guide way 33 of the rotor and are provided in their inner ends with the longitudinally extending slots 36 to receive the ribs 34, said ribs guiding the blades 35 in their movement and holding the same against lateral movement with respect to the rotor. It will be noted that the blades 35 are of the same width as the rotor and the longitudinal edges of said blades engage closely with the inner faces of the casing plates 10. In a groove or channel 37 in the periphery of each of the rotor blades 35, a packing strip 38 is arranged. The ends of these packing strips extend beyond the ends of the blades and lap upon each other as clearly shown in Fig. 5 of the drawings. These packing strips effectually prevent the passage of the actuating fluid between the edges of the blades and the walls of the motor case.

A pump of any preferred type indicated at 39 is arranged beneath the body of the vehicle, and this pump is connected to the motor case by means of a system of fluid circulating pipes. The actuating fluid is supplied to the motor through the medium of pipes 40 and 41 connected to the pump cylinder, in the following manner: The pipes 43 and 44 respectively, are connected to the pipe 40 and spaced ports 45 which are provided in the upper annular wall section 5 on opposite sides of the center thereof. These pipes are connected by means of the pipe 46 and valves 46' are arranged in the pipes 43 and 44 at the juncture of the pipe 46 therewith. These valves are connected by a stem 42 for simultaneous operation to open communication between the pipes 43 and 44 and the motor 5 or close the same when it is desired to stop the operation of the motor without interrupting the operation of the engine. A three-way valve 47 is arranged at the juncture of the pipes 43 and 44 with the pipe 40. Branch pipes 48 and 49 extend from the pipes 43 and 44 and are connected to the lower end of the pipe 42, communication between said branch pipes, and the pipe 41 being controlled by means of the valve 50.

51 indicates the pump piston rod, upon the outer end of which a sleeve 52 is swiveled. Upon the shaft of the engine or other prime mover 53, an eccentric is secured and has a band 54 arranged upon its periphery. This band is provided with a depending arm 55 which is connected by means of a ball and socket joint 56 to one arm of a bell crank lever 57 which is fulcrumed as at 58 upon any stationary part fixed to the chassis of the vehicle. The other arm of the lever 57 is forked and the branches thereof are provided with longitudinal slots 59 to receive a cross pin 60 on the lower transversely extended end of a rod 61. The upper end of this rod is pivotally connected to the angular arm 63 of a lever 62 which extends through the floor F of the vehicle and is provided with the usual dog for engagement with the teeth of a rack 64 whereby said lever may be held in an adjusted position. The rod 61 extends through the swiveled sleeve 52 on the end of the piston rod 51, and it will be obvious that by simply shifting the lever 62 to raise or lower the rod 61, the speed of reciprocation of the pump piston which is transmitted from the motor shaft may be varied as desired. When the pin 60 on the lower end of the rod 61 is disposed adjacent to the fulcrum 58 of the lever 57, the stroke of the pump piston will be comparatively short, and as this pin is moved outwardly in the slots 59, the piston stroke is correspondingly lengthened. Thus greater or less pressure upon the blades of the rotor 19 may be obtained to drive said rotor at different speeds. The admission of the actuating fluid from the pump cylinder 39 through the pipes 43 and 44 to the motor case is controlled by means of the valve 47 which is actuated through the medium of a foot pedal 65 mounted in the floor of the vehicle and connected by means of a rod 66 to a crank on the upper end of the valve stem.

In the operation of my improved power transmission device, the operator after shifting the lever 62 to obtain the desired length of stroke of the pump piston, opens the three-way valve 47 to supply the actuating fluid through the pipe 44 to the motor case, and the pressure of this fluid acting upon one of the rotor blades drives said rotor to the right as indicated by the arrow in Fig. 9. Communication between the pipe 43 and pipe 40 is closed as is also communication between the branch 49 of the pipe 44 and the lower pipe 41 which is connected to the pump cylinder. The actuating fluid is exhausted from the motor case through the other port thereof to which the pipe 43 is connected and passes through the branch 48 of this pipe and through the pipe 41 back into the pump cylinder into which it is drawn by the suction stroke of the piston. In order to reverse the rotation of the rotor, the three-way valve 47 is moved to close the feed through the pipe 44 and open communication between the pipe 43 and the pipe 40 so that the pipe 44 becomes the exhaust pipe and the pipe 43 the feed pipe. Communication between the lower pipe 41 and the branch 49 of the pipe 44 is opened through the valve 50, and the valve 47 at the juncture of the pipes 44 and 40 is closed. Thus when the pressure of the fluid is admitted through the pipe 43 to the motor case, the rotation of the rotor is reversed and the fluid exhausted through the other port in the transmission case into the pipe 44 from which it flows through the branch pipe 49 and the pipe 41 back into the pump cylinder. In the rotation of the rotor about the eccentric 25, the movable blades 35 are alternately forced inwardly into the guide ways 33 of the rotor as such guide ways approach the exhaust port of the motor case. The eccentric 25 being concentrically located with relation to the motor case but eccentrically disposed with relation to the rotor, provides a space between the periphery of the rotor and the annular wall of the case within which the actuating fluid acts upon the projecting portion of one of the rotor blades and forces the rotor around the eccentric 25, thereby rotating the transmission shaft 31. The rotor blades are forced outwardly in the rotation of the rotor by the eccentric disk 25 and held in engagement with the annular wall of the motor case, and their movement in a circular path is continued by the pressure of the actuating fluid thereagainst, said eccentric holding the outer ends of said rotor blades in close contact with the casing wall. The packing strip 13 effectually prevents the passage of the fluid around the sides of the rotor and through the bore of the bearing arm 18.

From the foregoing it is believed that the construction and manner of operation of my improved hydraulic transmission device will be clearly understood. It will be apparent that the suction created through the circulatory pipe system whereby the actuating fluid is drawn from the motor case will materially assist in the rotation of the rotor, and as the exhaust and feed of the actuating fluid takes place simultaneously and at all times except when the rotor blades are passing the ports in the motor case, it will be obvious that dead centers are avoided, thus securing a maximum of operating efficiency. It will of course, be understood that water, steam, gas, or other actuating fluid may be employed for the operation of the device. It will further be apparent that the invention is not limited to the precise details above pointed out, as the device will obviously be somewhat modified in the form, proportion and arrangement of the several elements in adapting the same for use upon motor vehicles of various types, and I do not therefore wish to be limited to the specific construction of the invention as shown and described but reserve the right to make such alterations therein as may fall within the scope of the appended claims.

Having thus described the invention, what is claimed is:

1. In combination, a power transmission device including a motor, an engine, a pump, a circulating pipe system between the pump cylinder and motor case, an oscillating element, an eccentric on the engine shaft, connecting means between said eccentric and said element to oscillate the latter, a rod adjustably engaged at one of its ends with said element and movably connected to the rod of the piston, and means for adjusting said rod whereby the length of the stroke of the piston may be varied.

2. In combination, a power transmission device, including a motor, an engine, a pump, a circulating pipe system between the pump cylinder and motor case, an oscillatory bell crank lever, an eccentric on the engine shaft, a strap for said eccentric connected to one arm of the lever to oscillate the same, a rod adjustably engaged with the other arm of said lever, means loosely connecting said rod to the rod of the piston, and means for adjusting said rod to vary the length of the stroke of the pump piston.

3. In combination, a power transmission device, including a motor, an engine, a pump, a circulating pipe system, between the pump cylinder and motor case, an oscillatory bell crank lever, an eccentric on the engine shaft and an eccentric strap connected to one arm of the lever to oscillate the same, the other arm of said lever being longitudinally slotted, a rod provided with a pin movable in said slot, a swiveled sleeve on the end of the rod of the pump piston through which said first named rod is loosely movable, and means for adjusting said rod to vary the length of the stroke of the pump piston.

4. A motor comprising a case provided with a bearing, a disk concentrically arranged within said case, a sleeve fixed to the disk and keyed in said bearing, a power transmission shaft mounted in the bearing and rotatably disposed within said sleeve, and a rotor provided with pressure receiving means fixed upon the inner end of said shaft, said rotor having an eccentrically disposed internal pocket to receive said disk.

5. A motor comprising a case provided with a laterally extending bearing eccentrically formed upon one side of the case, a disk concentrically arranged within the case, a sleeve eccentrically secured to the disk and fixed in said bearing, a power transmission shaft mounted to rotate in said sleeve, a rotor consisting of two sections one of which is fixed upon said shaft, said rotor section being provided with an eccentrically disposed pocket to receive said disk, and impelling means radially movable in the rotor sections and adapted to extend between the periphery of the disk and the annular wall of the transmission case.

6. A motor comprising a case, a fixed disk concentrically located in said case, a power transmission shaft rotatable in said disk, a rotor comprising two sections one of which is fixed upon the shaft, said rotor section being provided with an eccentrically disposed pocket to receive said disk, said rotor sections being also provided with a diametrically extending slot intersecting the disk pocket, parallel ribs connecting the opposed walls of said slots, and impelling blades mounted upon said ribs for radial movement in the slot, said disk holding the outer ends of said blades in contact with the annular wall of the case in the rotation of the rotor.

7. A motor comprising a case having an eccentrically disposed tubular bearing arm projecting from one of the side walls thereof, a disk concentrically disposed within the case, a sleeve on said disk fixed in the bearing arm, a power transmission shaft rotatably mounted in said sleeve and extending through the disk, a rotor fixed upon said shaft and provided with an eccentrically disposed internal pocket to receive said disk, said rotor having a diametrically extending slot, radially movable blades mounted in said slot and projected by the disk into engagement with the annular wall of the case in the rotation of said rotor, and guide means in the slot for said blades.

8. A motor comprising a case provided with an eccentric bearing on one side, a disk concentrically mounted within the case, a sleeve projecting from the disk and fixed in said bearing, a power transmission shaft rotatably mounted in the sleeve and extending through the disk, a rotor comprising two sections one of which is loosely mounted upon said sleeve, the other of the rotor sections being fixed upon the transmission shaft, said latter section having an eccentrically disposed pocket in one face to receive the disk, said rotor sections being provided with a diametrically extending slot and parallel ribs connecting the opposed walls of said slot at opposite sides of the disk pocket, and impelling blades radially movable in said slot and provided with longitudinal recesses to receive said ribs, said blades being projected outwardly into engagement with the annular wall of the rotor casing by said disk in the rotation of the rotor.

In testimony whereof I hereunto affix my signature in the presence of two witnesses.

WILLIAM I. WHEELER.

Witnesses:
E. G. WHEELER,
GEO. W. DALBY.